Jan. 4, 1938. D. D. JACKSON ET AL 2,104,520
GAUGE
Filed March 2, 1934
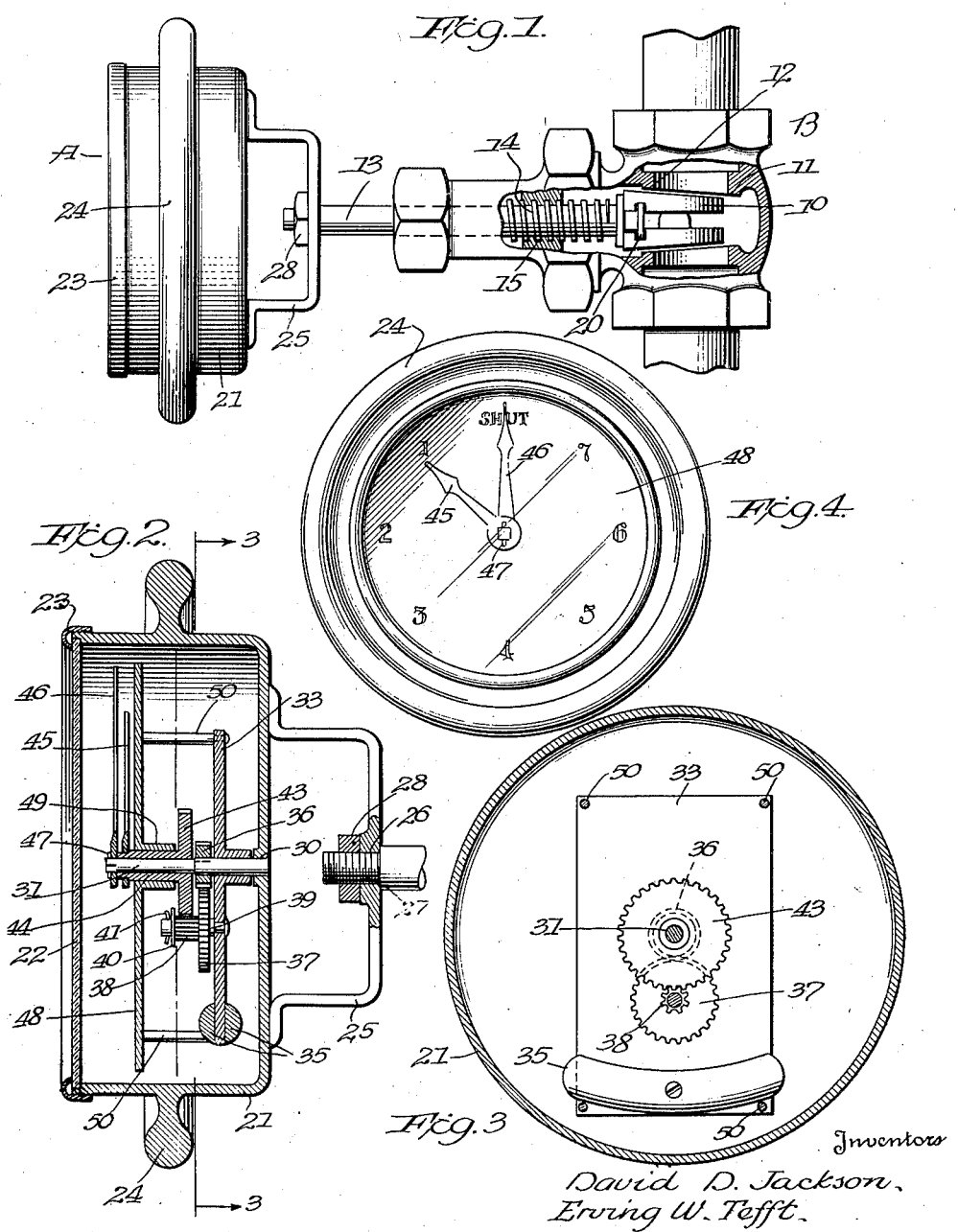
Inventors
David D. Jackson,
Erving W. Tefft.

Patented Jan. 4, 1938

2,104,520

UNITED STATES PATENT OFFICE 2,104,520

GAUGE

David D. Jackson, Providence, R. I., and Erving W. Tefft, South Attleboro, Mass., assignors to Tefft-Jackson, Incorporated, Pawtucket, R. I., a corporation of Rhode Island Application March 2, 1934, Serial No. 713,744

4 Claims. (Cl. 116—125)

The present invention relates to a gauge, and more particularly, to a gauge useful to show the movement or position of a rotatable or otherwise movable element.

It is frequently necessary, in operating members which travel in a predetermined path, to have some indication of the position of the member in the path, or the movement of the member in that path.

For instance, valves for controlling the flow of fluid through a conduit are often set at an intermediate position between the full closed and full open positions, and it is desirable to have a gauge or indicator to show the position of the valve. Similarly, in operating tools which are moved from and toward the work, it is convenient to have some indication of the position of the tool with respect to the work.

An object of the invention is to provide a gauge which will indicate the position of an element in its path of movement.

Another object of the invention is to provide a gauge assembly which may be conveniently secured to a rotatable stem or shaft in order to indicate the position and degree of rotation of the shaft.

Another object of the invention is to provide such a gauge assembly which will serve as a handle for rotating the stem or shaft.

A further object of the invention is to provide a gauge assembly of this character which may be temporarily or permanently attached to a stem or shaft, which occupies little space and is so constructed as to make unnecessary any external supports which would obstruct access to and around the movable or rotatable element.

In the drawing, the invention is shown attached to a valve stem, but it will be obvious from the following description that it may be applied to many and various devices.

In the drawing:

Figure 1 shows a particular application of the use of the indicator, in which it is connected with the stem of an ordinary gate valve.

Figure 2 is a vertical sectional view of the gauge, showing the internal working parts.

Figure 3 is a section on the line 3—3 of Figure 2.

Figure 4 is a front elevation of the gauge, showing the dial face and indicating members.

In Figure 1, the particular application of the invention to a gate valve for fluid control is shown, and in this figure, A generally indicates the gauge and assembly which is the subject of this invention, it being shown as applied to the valve designated generally by the letter B.

The movable member is shown as the gate 10 of the valve B, the inner end of which is adapted to be moved from the fixed point 11, which may designate the fully closed position of the valve, to the fixed point 12, which may designate the fully open position of the valve. The movable member 10 is moved between the fixed points 11 and 12 by rotation of the rotatable element, which is shown in this application as the valve stem 13, said valve stem being provided with an external screw-threaded portion 14 meshing with the interior screw threads 15 of the valve casing. The valve stem 13 is so coupled at its inner end to the plug 10 that when the valve stem is rotated, the plug will be moved, by translational movement, from or toward its closed position.

The valve shown is of such construction that substantially eight counterclockwise rotations of shaft 13 will move the movable member from fixed point 11 to fixed point 12, i. e., from fully closed position to fully open position; and obviously, eight clockwise rotations of shaft 13 will move the movable element from fixed point 12 to fixed point 11.

Referring to Figure 2, the gauge assembly A is shown as comprising a cylindrical casing 21 which may have its front face covered by a circular glass 22 retained in place by the annular cover ring 23. The casing has cast integral therewith and extending around its outside circumference a hand wheel 24, which may be manually operated to turn the rotatable element and thus cause the movable member to be translated between the fixed points. A bracket 25 is secured to the back face of the casing, and is provided at its center with an aperture 26 which coincides with the axis of the hand wheel 24. The threaded extension 27 of the rotatable element extends into the aperture 26, and a nut 28 threaded onto extension 27 serves to rigidly hold the bracket and the entire gauge assembly to the end of the rotatable element. In the center of the rear wall of the gauge casing, and in alignment with the center of the rotatable element, is a screw-threaded aperture 30, in which aperture a stub-shaft 31 is rigidly retained, said stub shaft extending into the interior of the casing and in alignment with the center of the rotatable element.

It will thus be seen that when the operator rotates hand wheel 24 to move the movable element 10, the entire casing will rotate, and with it the stub shaft 31.

Near the rear of the casing, a gravity responsive member 33, preferably in the form of a rectangular plate, is mounted on the shaft 31, the member 33 being free on the shaft. At the lower edge of plate 33, and secured to the opposite faces thereof, are a pair of segmental weights 35, so that when the casing and stub shaft are rotated in moving the movable element, the plate 33 will be retained in substantially the position shown, by reason of its loose connection with the stub shaft 31, and because of the provision of the weights 35 at the lower end of the plate.

A driving pinion 36 is keyed to the stub shaft 31 adjacent to and in front of plate 33, this drive pinion meshing with a relatively large driven gear 37 which is rotatable on a pin 39 projecting from the plate 33. Integral with driven gear 37 and on the front face thereof is a relatively small drive gear 38, gears 37 and 38 being retained on the pin between a shoulder and a washer 40 by the split pin 41. Drive gear 38 meshes with and serves to rotate a relatively large driven pinion 43, said pinion being provided with a sleeve 44 which extends toward the forward end of the stub shaft and is free upon the same. Sleeve 44 is provided with a squared end, to which is rigidly secured for rotation therewith a small pointer 45. Similarly, the forward end of the stub shaft is squared and split, and a large pointer 46 is secured for rotation with the stub shaft 31, this pointer being held by a pin 47. Journaled on the sleeve 44 is a circular dial face 48 having a bushing 49 which embraces sleeve 44. Dial face 48 is rigidly connected with the stationary member 33 by means of a plurality of rods 50, so that the dial face will remain stationary when the gauge rotates with the rotatable element.

As shown in Figure 4, the dial face is graduated circumferentially by eight markings, which markings serve to indicate the number of rotations of the rotatable element necessary to move the movable member from one to another of the fixed points. Obviously, any suitable calibrations could be made upon the dial face to conform to the particular application of the invention.

In operation, if it is desired to set the position of the movable member, the operator rotates the rotatable element or shaft 13 by turning the hand wheel 24, this rotation obviously causing the entire gauge casing to rotate. When the gauge casing rotates, the stub shaft 31 will rotate, due to its connection to the rear wall of the casing at 30, and the driving pinion 36 will also rotate with the stub shaft. The movement of the driving pinion 36 will turn the driven gear 37 on a fixed axis 39, said axis being retained fixed by reason of the loose mounting of plate 33 on the stub shaft, and the provision of the retaining weights 35. Gear 38 in turn drives driven pinion 43, which will rotate in the same direction as and at a predetermined speed less than the speed of rotation of the stub shaft 31, depending on the size of the gears 36, 37, 38, and 43. Consequently, pointer 45 will rotate at a speed less than pointer 46, depending on the value of the above-mentioned gear train.

In the application of the invention illustrated, the value of the gear train is such that the small pointer 45 will be caused to move at one-eighth of the speed of the large pointer 46, and in the same direction. That is, when the movable element is turned through one complete rotation, and pointer 46 consequently makes one complete revolution, the small pointer 45 will move one-eighth of the dial face 48. For instance, in the particular application shown, if the operator wishes to open the valve about one-eighth from full shut position, by rotating the rotatable element 13 through a complete revolution, which would be indicated by one counterclockwise rotation of large pointer 46, the small pointer would thereby be moved from the shut position counterclockwise to the position marked 1 as shown in Figure 4. It will be understood that both of the pointers will have been set at zero of the dial when the valve is at full closed position by adjusting the bracket 25 on the valve stem extension 27 before setting up on nut 28. One further counterclockwise rotation of the rotatable element and pointer 46 would likewise move small pointer 45 from position 1 to position 2, at which time the valve would be one-fourth open. Similarly, by turning the hand wheel in a clockwise direction to shut the valve, the mechanism will operate to move small pointer 45 in a clockwise direction. If the shaft is stopped between complete rotations, pointer 45 will indicate on the scale the number of complete turns, while pointer 46 will indicate on the scale fractions of a turn.

Thus in the particular application shown, the gauge provides a convenient indicator for showing at all times the position of the valve plug, and an attendant can readily perceive the position of the valve without being required to completely close it and then open it the desired number of turns.

While we have shown the invention applied to indicate the position of a valve plug, it is obvious that the invention has many other applications, and the manner of connecting the invention to other devices will be apparent from the above description of its connection to a valve.

In addition to showing the position of a movable member, the gauge would also be useful as applied to a slowly revolving shaft, to facilitate the ascertaining of the speed of rotation of said shaft.

Furthermore, the gauge could be applied to any rotating wheel, and due to the action of the weights, it would be possible to indicate rotations of the wheel without necessarily attaching the gauge at the center of rotation thereof. That is, the indicator would function even if the gauge were attached near the periphery of the rotating wheel.

It will be understood that the invention is not limited to the details of construction shown in the drawing and described in the specification and that the examples of the use of the device which have been given do not include all of the uses of which the device is capable; also, that the phraseology employed in the specification is for the purpose of description and not of limitation.

We claim:

1. In combination, a member movable between fixed points, a rotatable shaft for moving said member, a gauge mounted on said shaft including a dial and a cooperating pair of indicating members, one of said indicating members being adapted to rotate with said shaft, and means including a gravity responsive member for rotating the other of said indicating members at a predetermined speed to indicate revolutions of said first mentioned indicating member.

2. In a valve position indicator, a valve member movable between closed and open positions, a rotatable valve stem for moving said valve member, a gauge mounted on said stem including a dial and a cooperating pair of indicating members, one of said indicating members being adapted to rotate with said stem, and means including a gravity responsive member for rotating the other of said indicating members at a predetermined speed to indicate revolutions of said first mentioned indicating member.

3. In a valve position indicator, a valve member movable between closed and open positions, a rotatable stem for moving said valve member, a gauge comprising a casing mounted on said stem, a bracket fixed to said casing, means for removably securing said bracket to the end of said stem to fix said casing to said stem in spaced relation to the end of said stem, said gauge including a dial and a cooperating pair of indicating members in said casing, one of said indicating members being adapted to rotate with said stem, and means including a gravity responsive member in said casing for rotating the other of said indicating members at a predetermined speed to indicate revolutions of said first mentioned indicating member.

4. In a valve position indicator, a valve member movable between closed and open positions, a rotatable valve stem for moving said valve member, a gauge comprising a casing mounted on said stem for rotation therewith, a stub shaft fixed to said casing within the same, an indicating member carried by said shaft and adapted to rotate with said stem, a gravity responsive member loosely mounted on said shaft, a dial face secured to said gravity responsive member, an indicating element in said gauge, and means to operate said indicating element comprising a gear train comprising a drive gear mounted on and rotating with said shaft, intermediate gears carried by said gravity responsive member, and a driven gear carrying said indicating element rotatable on said shaft, said gear train rotating said indicating element at a predetermined speed to indicate revolutions of said indicating member, said indicating member and said indicating element cooperating with said dial face to indicate the position of said valve member.

DAVID D. JACKSON.
ERVING W. TEFFT.